United States Patent

[11] 3,589,200

| [72] | Inventor | Vilgot Raymond Nilsson<br>Hagersten, Sweden |
|---|---|---|
| [21] | Appl. No. | 760,316 |
| [22] | Filed | Sept. 17, 1968 |
| [45] | Patented | June 29, 1971 |
| [73] | Assignee | Alfa-Laval AB<br>Tumba, Sweden |
| [32] | Priority | Sept. 26, 1967 |
| [33] | | Sweden |
| [31] | | 13184/67 |

[54] APPARATUS FOR MEASURING THE DENSITY OF LIQUIDS
6 Claims, 1 Drawing Fig.

| [52] | U.S. Cl. | 73/438 |
|---|---|---|
| [51] | Int. Cl. | G01n 9/26 |
| [50] | Field of Search | 73/32, 438, 407; 92/5, 60, 145; 137/91 |

[56] References Cited
UNITED STATES PATENTS

| 2,056,187 | 10/1936 | Hay | 73/438 |
| 2,211,748 | 8/1940 | Devenish | 73/438 |
| 2,357,639 | 9/1944 | Elias | 73/438 |

FOREIGN PATENTS

| 1,518,298 | 2/1968 | France | 73/438 |
| 1,125,540 | 10/1956 | France | 73/438 |

Primary Examiner—Richard C. Queisser
Assistant Examiner—C. E. Snee, III
Attorney—Davis, Hoxie, Faithfull and Hapgood

ABSTRACT: A closed space filled with a reference liquid is arranged within a container for the process liquid of which the density is to be measured, the confining walls of the closed space consisting at least partly of a flexible material adapted to transmit pressure between the two liquids; and means are provided for sensing at the same level the pressure of the process liquid and the pressure of the reference liquid, and for comparing the sensed pressures. The process liquid may be passed continuously through the container by way of inlet and outlet openings so arranged that any dynamic pressure variation has counteracting effects on the two sensed pressures, due to the flexible wall.

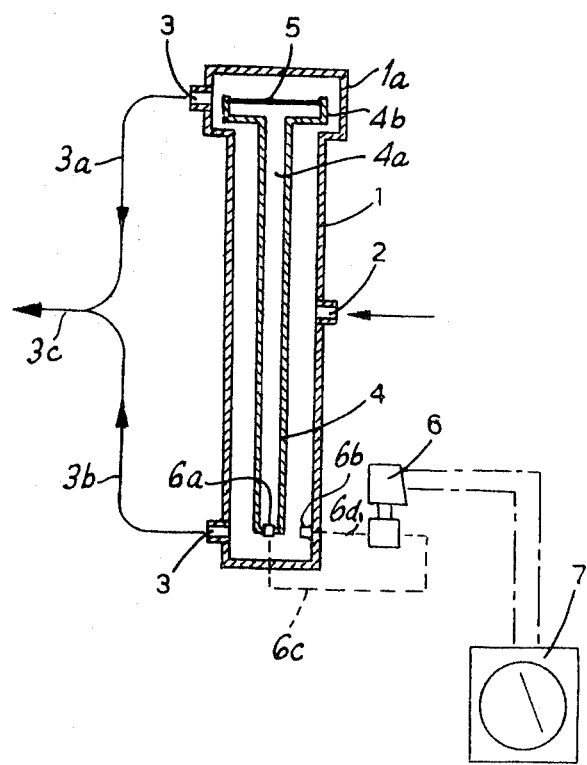

APPARATUS FOR MEASURING THE DENSITY OF LIQUIDS

THE DISCLOSURE

The present invention relates to an apparatus for measuring the density of a liquid (hereinafter referred to as the process liquid), comprising a container for the process liquid and a closed space arranged within the container and surrounded by process liquid, which space contains a reference liquid such as water and is confined by walls at least partly consisting of a flexible material adapted to transmit pressure between the two liquids.

The apparatus according to the invention is characterized by means operable to sense the respective pressures of the process liquid and the reference liquid at a single common level and to compare these sensed pressures, the difference between the pressures being a measurement of the difference in density between the two liquids.

By means of the apparatus according to the invention, it is possible to achieve the most accurate measurement results without taking into account the prevailing temperature and pressure of the process liquid. This is because the reference liquid within the closed space will automatically be subjected to the same pressure and temperature as the process liquid, due to the construction of the apparatus, whereby the pressure comparing means will measure the same pressure difference regardless of possible fluctuations in these values. For the achievement of an accurate measurement result, it is necessary, of course, to use a reference liquid having a coefficient of volumetric expansion not differing substantially from that of the process liquid.

It is very simple to arrange the above-described apparatus for continuous measuring of the density of a liquid flowing through a conduit, in which case the aforesaid container is closed except for inlet and outlet openings for the process liquid. The difference between the pressures of the two liquids, measured by the pressure comparing means, may be recorded by a recorder and/or be caused to actuate a controlling device, as for controlling the concentration of a certain substance in the process liquid.

If the flow of process liquid through the container may cause dynamic pressure variations, the inlet and outlet openings of the container should be so situated and dimensioned in relation to each other and with respect to the position of the flexible pressure-transmitting wall of the closed space, on one hand, and the position of the level at which the pressure comparing means senses pressures, on the other hand, that a pressure change at the pressure sensing level in the container, caused by the flow of process liquid through it, will be as large as a similarly caused pressure change transmitted to the reference liquid through the flexible wall.

The invention is further described below with reference to the accompanying drawing in which the single illustration is a view, partly in vertical section and partly diagrammatic, of one embodiment of the invention.

In the illustrated embodiment, the apparatus according to the invention comprises a substantially cylindrical, sleevelike container 1 provided with an inlet 2 and two outlets 3 for process liquid, that is, liquid the density of which is to be measured. Except for its inlet and outlets the container 1 is entirely closed and may thus be put into a closed system of conduits and be continuously passed through by process liquid. The inlet 2 is situated at about the middle of the cylindrical container 1, while the outlets 3 are situated at the upper and lower end portions of the container at equal distances from the inlet 2. The flow of process liquid into and out of the container 1 is illustrated in the drawings by means of arrows. As can be seen, the two liquid streams 3a and 3b leaving the container 1 through the outlets 3 are joined at 3c at the same level as the inlet 2.

Coaxially within the container 1 is a pipe 4 which is closed at both ends to form a closed space 4a containing a reference liquid (in this case water) the density of which is known. The pipe 4 has a somewhat widened part 4b at its upper portions, which is located in an enlarged upper portion 1a of the container. The top of the pipe enlargement 4b is closed by a membrane 5 adapted to transmit pressure between the process liquid, surrounding the closed pipe 4, and the reference liquid within the pipe 4.

The apparatus according to the invention also has means for comparing the pressure of the process liquid at a level in the lower portion of the container 1 with the pressure of the reference liquid within the pipe 4 at the same level. In the illustrated embodiment of the invention such means comprise a so-called pressure difference converter 6, which is a well known instrument operable to sense two difference pressures and to give off a signal proportional to the difference between the two sensed pressures, As shown, the pressure difference converter 6 senses the two pressures from the pressure responsive devices 6a and 6b through the respective connections 6c and 6d by which the pressure impulses are transferred from the two liquids to the converter 6. The signal given off by the converter 6 is received by a register means 7, such as a so-called recorder. The register means 7 may, if desired, be replaced or supplemented by control means for adjusting the density of the process liquid in response to changes in the values measured by the apparatus according to the invention.

As shown in the drawing, the pressure-responsive device 6a is located at the bottom of pipe 4 and at the same level as the pressure-responsive device 6b, which is mounted on the inner side wall of container 1. The pipe 4 may be mounted in any suitable manner (not shown) in its illustrated position in container 1.

The signal from the pressure difference converter is independent of pressure variations sensed in the container 1 is caused by pressure and/or temperature variations in the process liquid flowing through the latter. This is because corresponding pressure and/or temperature variations are immediately transmitted to the reference liquid within the pipe 4, due to the membrane 5 and the fact that the pipe 4 is situated within the container 1 and thus is entirely surrounded by the process liquid.

Of course, only the portion of the reference liquid situated above the pressure sensing level will influence the pressure sensed at this level. Therefore, it does not matter if the pipe 4, below the pressure sensing level, extends to a lower level than the container 1 for the process liquid. However, in order to obtain the most effective equalization of temperature between the two liquids, the arrangement shown in the drawing is preferred.

In an embodiment of the invention by means of which very good measurement results have been achieved, even with large static as well as dynamical pressure changes in the process liquid during the measuring, the container for the process liquid, the outlet of this container, and the conduits connected to these outlets are formed as one single conduit having a substantially uniform cross section. This conduit extends so that it forms all the four sides of a vertically disposed, imaginary rectangle, the inlet of the whole apparatus being situated at the middle of one of the vertical rectangle sides, and the outlet being situated at the middle of the other vertical rectangle side. Thus, the single conduit is in effect an endless duct forming a generally rectangular loop and which is closed except for the aforesaid inlet and outlet situated at the middle of the two vertical portions, respectively, of the rectangular loop, the pipe 4 for the reference liquid being located in the vertical portion having the inlet.

I claim:

1. In an apparatus for measuring the density of a liquid, hereinafter referred to as the process liquid, the combination of a container for the process liquid, wall means forming a closed space within said container and surrounded by the process liquid in the container, said wall means being substantially fixed relative to the container, a reference liquid filling the closed space, said wall means being at least partly constituted by a flexible wall adapted to transmit pressure between said process and reference liquids, and means operable to sense separately and compare the pressures of the reference and process liquids, respectively, at the same level in said closed space and the surrounding part of the container, respectively, said level being located below the level of said flexible wall.

2. The combination according to claim 1, in which said wall means include a substantially vertical pipe closed at its lower end, and a horizontal membrane closing the upper end of the pipe and forming said flexible wall.

3. The combination according to claim 1, in which said container is closed and has inlet and outlet openings for the process liquid, said openings being so located and dimensioned relative to each other, and with respect to the position of said flexible wall and the position of said pressure sensing level, that a pressure change in the process liquid at said level in the container, caused by the flow of the process liquid through the container, will be as large as similarly caused pressure change transmitted through said flexible wall to the reference liquid.

4. The combination according to claim 3, in which said flexible wall and pressure sensing level are located at the upper and lower end portions, respectively, of the container, said openings including an inlet located between and at equal distances from said flexible wall and sensing level, the openings also including two outlets located above and below said flexible wall and sensing level, respectively, and at equal distances from said inlet.

5. The combination according to claim 3, in which said openings include an inlet and two outlets located above and below the level of said inlet, the combination comprising also first conduits connected to the respective outlets and a common outlet conduit to which said first conduits lead and which is located at said level of the inlet.

6. The combination according to claim 1, in which said pressure sensing and comparing means consist of a pressure difference converter.